United States Patent [19]

Pepi

[11] Patent Number: 5,268,154
[45] Date of Patent: Dec. 7, 1993

[54] PROCESS FOR DISAGGREGATING BORONATROCALCITE ORE IN AN ALKALINE MEDIUM FOR THE PRODUCTION OF SODIUM BORATE AND CALCIUM BORATE

[75] Inventor: Mario Pepi, Limite Sull'Arno, Italy

[73] Assignee: Bitossi Dianella S.p.A., Savigliana Vinci, Italy

[21] Appl. No.: 887,153

[22] Filed: May 22, 1992

Related U.S. Application Data

[63] Continuation-in-part of Ser. No. 710,549, Jun. 5, 1991, abandoned.

[30] Foreign Application Priority Data

Jun. 8, 1990 [IT] Italy .............................. 20590REGA
Jun. 3, 1991 [EP] European Pat. Off. ......... 91109022.3

[51] Int. Cl.$^5$ ..................... C01D 13/00; C01D 11/00; C01B 35/00
[52] U.S. Cl. ................................... 423/158; 423/159; 423/165; 423/184; 423/195; 423/279
[58] Field of Search .............. 423/276, 277, 278, 279, 423/280, 281, 184, 179, 158, 159, 165, 195

[56] References Cited

U.S. PATENT DOCUMENTS

| | | | |
|---|---|---|---|
| 2,159,999 | 5/1938 | Reichert et al. | 423/277 |
| 2,773,738 | 12/1956 | Ball et al. | 423/280 |
| 3,000,701 | 9/1961 | Nies | 423/279 |
| 3,107,613 | 10/1963 | Armstrong et al. | 423/277 |
| 3,801,703 | 4/1974 | Bither | 423/277 |
| 3,860,692 | 1/1975 | Nies et al. | 423/279 |
| 4,270,944 | 6/1981 | Eastes | 423/280 |

FOREIGN PATENT DOCUMENTS

| | | |
|---|---|---|
| 135185 | 4/1979 | Fed. Rep. of Germany . |
| 3029349 | 4/1981 | Fed. Rep. of Germany . |
| 1508966 | 12/1967 | France . |
| 2091041 | 1/1972 | France . |
| 56-120513 | 9/1981 | Japan . |
| 1028599 | 2/1981 | U.S.S.R. . |
| 854879 | 8/1991 | U.S.S.R. . |
| 1297743 | 11/1972 | United Kingdom . |
| 1484559 | 9/1977 | United Kingdom . |

OTHER PUBLICATIONS

Hackh's Chemical Dictionary Third Addition, p. 416 (1944).
Chemical Abstracts 17381j vol. 95, p. 720 (1981).
Chemical Abstracts 33099s vol. 92, No. 3 (1980).
Ullman's Encyclopedia of Chemical Technique; 4th vol.; (1953); pp. 585-586 and pp. 591-592.
Kirk Othmer Encyclopedia of Chemical Technology; vol. 3; (1964) pp. 628-631.
Abstract of German Patent 643,879; Heavy Metals; vol. 18; Col. 5957; (1937).
Hawleys Condensed Chemical Dictionary; 11th Edition; (1987); pp. 799-780.

*Primary Examiner*—David Brunsman
*Attorney, Agent, or Firm*—Oliff & Berridge

[57] ABSTRACT

A process for disaggregating boronatrocalcite ore (Ulexite) in an alkaline aqueous medium for the production of sodium borate and calcium borate, characterized in that boronatrocalcite is dispersed in alkaline mother liquor having a $H_3BO_3/Na_2O$ weight ratio ranging from 1.8 to 2.7, at a temperature of 120°–200° C. under autogenous pressure of 2–16 bars, under intense stirring.

7 Claims, 1 Drawing Sheet

PROCESS FOR DISAGGREGATING BORONATROCALCITE ORE IN AN ALKALINE MEDIUM FOR THE PRODUCTION OF SODIUM BORATE AND CALCIUM BORATE

This is a continuation-in-part of U.S. application Ser. No. 07/710,549 filed Jun. 5, 1991, now abandoned.

FIELD OF THE INVENTION

The present invention relates to a process for disaggregating boronatrocalcite ore (Ulexite) in an alkaline medium in order to produce sodium borate and calcium borate. In particular, said disaggregation is carried out by digestion at high temperature and pressure, with alkaline solution having composition corresponding about to that of sodium metaborate.

PRIOR ART

Boronatrocalcite, or Ulexite, is an ore of formula $Na_2O.2CaO.5B_2O_3.16H_2O$, which contains also magnesium, silica, aluminium and iron impurities. It can be utilized for producing sodium borates, in particular sodium borate deca- and penta-hydrate, which are known salts also directly obtainable from Tinkal and Rasorite by means of dissolution in water or mother liquors, filtration, crystallization, drying and storing. From Ulexite it is possible also to obtain calcium borate. The latter is utilized for producing boric acid according to German patent n. 643 879 (1937), just as is described in ULLMAN Encyclopedia of Chemical Technique, 1953, 4th vol., page 585 and in KIRK OTHMER Encyclopedia of Chemical Technology, 2nd edition, 1964, 3rd vol., page 628, by carrying out the digestion of said ore by means of sulphuric acid according to the following reactions:

$$2CaO.3B_2O_3.5H_2O + 6H_2O + 2H_2SO_4 = 2CaSO_4.2\text{-}H_2O + 6H_3BO_3 \quad (2)$$

$$4CaO.5B_2O_3.7H_2O + 12H_2O + 4H_2SO_4 = 4CaSO_4.2\text{-}H_2O + 10H_3BO_3 \quad (3)$$

In South America, where Ulexite is available in large amounts, the processes intended for the exploitation thereof in order to produce sodium borates and boric acid are so far economically unprofitable. In fact, in order to obtain sodium borates, Ulexite is subjected to an attack with sodium carbonate and bicarbonate according to the reaction:

$$2(Na_2O.2CaO.5B_2O_3.16H_2O) + 2Na_2CO_3 + 2NaHCO_3 = 4CaCO_3 + 5Na_2B_4O_7 + 17H_2O \quad (1)$$

This process is not valid from an economical viewpoint as it requires the consumption of two reagents, namely carbonate and bicarbonate, which render the Ulexite ore not competitive with the above-mentioned processes, which make use of Tinkal and Resorite. To produce boric acid, Ulexite is subjected to an acid disaggregation by sulphuric acid according to the following reaction:

$$Na_2O.2CaO.5B_2O_3.16H_2O + 3H_2SO_4 + 10H_2O = 2\text{-}CaSO_4.2H_2O + 10H_3BO_3 + Na_2SO_4.10H_2O \quad (4)$$

According to this process, however, the resulting product $H_3BO_3$, due to the solubility of sodium sulphate, results to be polluted by sulphates ($Na_2SO_4.10H_2O$).

In order to reduce said pollution, the solution must be purged, what entails a decrease in the plant production, or it is necessary to provide a boric recrystallization in order to render it commercially acceptable. As a consequence of all the foregoing, the production of boric acid starting from Ulexite is antieconomic.

SUMMARY

Thus, a process—which is the object of the present invention has been perfected, by means of which it is possible and economically profitable to quantitatively recover from Ulexite both sodium borate and calcium borate for the production of boric acid. The process according to the present invention comprises the disaggregation of Ulexite with aqueous mother liquor containing $H_3BO_3$ and $Na_2O$ in a specific ratio, having a pH of about 12, coming from a subsequent sodium borate crystallization step. The reaction is carried out at temperature comprised between 120° and 200° C. and under self-generated pressure, keeping the Ulexite aqueous suspension under intense stirring. The reaction time is dependent on the treatment temperature and is comprised preferably between 30 and 60 min.

This process permits to utilize Ulexite as an ore for producing borates and boric acid at costs comparable with the ones of the other boron ores (Colemanite, Rasorite, Tinkalite) and to obtain quality products.

DETAILED DESCRIPTION OF THE INVENTION

According to the invention the Ulexite ore, crushed to a granulometry preferably below 500 μm is dispersed in aqueous mother liquor, recycled from subsequent sodium borate crystallization step, having a pH of about 12 with a $H_3BO_3/Na_2O$ weight ratio ranging from 1.8 to 2.7, extremes included.

A preferred $H_3BO_3/Na_2O$ weight ratio ranges from 2.0 to 2.5. In this Ulexite disaggregation step, the aqueous dispersion is maintained at a temperature of 120°–200° C. under self-generated pressure corresponding to about 2–16 bars and under intense stirring. The process of the invention can be schematically represented by the following reaction:

$$2(Na_2O.2CaO.5B_2O_3.16H_2O) + \tfrac{1}{2}Na_2O = 5/2\text{-}(Na_2O.2B_2O_3.10H_2O) + 4CaO.5B_2O_3.7H_2O \quad (5)$$

During the reaction step the pH of the solution spontaneously varies from a pH of about 12 to a pH in the range of about 10–11 and the $H_3BO_3/Na_2O$ weight ratio ranges from starting value 1.8+2.7 to final value 3+3.5; such working conditions allow a complete dissolution of sodium borate and permit to reach the crystallization range values of sodium borate decahydrate (which however now remains still all in solution). The reaction time is dependent on the treatment temperature and is comprised preferably between 30 and 60 min.

Short time is requested by the disaggregation at high temperature (200° C.) but in this case the high pressure (16 bar) requires much expensive apparatus and higher running cost.

The suspension, after the disaggregation step, is sent to filtration where, by means of washing with warm water at about 60° C., sodium borate in solution and solid calcium borate are quantitatively recovered; the latter is then sent to drying and subsequently to storing, or it is sent to the production of $H_3BO_3$, for example according to the cited known techniques.

The solution recovered from filtration is preferably treated in vacuum crystallizers, the vacuum being such as to maintain the solution at 30° C. in order to precipitate, quantitatively also in this case, sodium borate decahydrate $Na_2B_4O_7.10H_2O$. Said product, after centrifugation, is sent to drying and then it is passed to storing and subsequently, if necessary, it is dissolved at about 90° C. in mother liquor and recrystallized at 70° C. to produce $Na_2B_4O_7.5H_2O$, which, after centrifugation, is dried and then sent to silos.

Said recrystallization is preferably carried out by using film crystallizers and by cooling with an air flow so as to maintain the solution at a temperature of about 70° C.

The mother liquor recovered from sodium borate crystallization at 30° C. is recycled to the disaggregation reaction-after having checked the pH and the $H_3BO_3/Na_2O$ ratio—with make-up addition of the sodium hydroxide which is necessary to the reaction. According to the reaction scheme (5) the theoretical amount of NaOH expressed as $Na_2O$ is about 19.12 g/1000 g ulexite. In the practice the disaggregation liquid amounts to 5+6 parts by w. for 1 part of ulexite. The $Na_2O$ concentration in the starting disaggregation liquid is comprised between 12 and 20 g/kg.

The reaction yields for sodium borate and calcium borate are around 100% of the theoretical values, on condition that it is operated in a closed cycle with a total recycle of the mother liquor. The yield of $H_3BO_3$ obtained from Ca borate is around 95%.

BRIEF DESCRIPTION OF THE DRAWING

The above illustrated operative steps are schematically shown in FIG. 1, wherefrom it is clearly inferable that by means of the process of the invention it is possible to produce in a continuous cycle, under regular operating conditions, borates and boric acid starting from Ulexite, in an economically profitable manner. The following example is given to better illustrate the present invention; however it shall not be construed as to be a limitation thereof.

EXAMPLE 1

Figure 1:
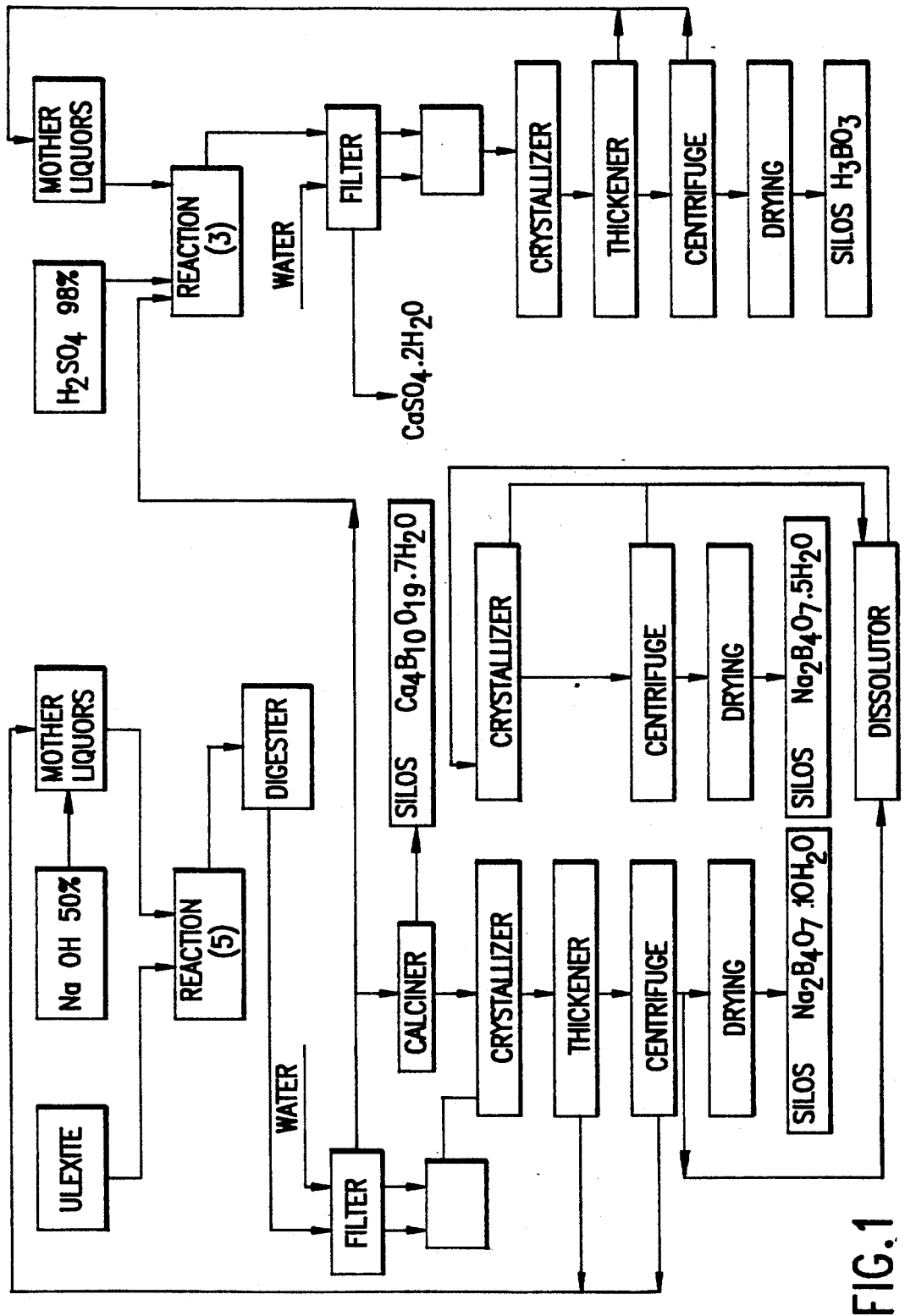

3827 g of a synthetic sodium borate mother liquor containing $H_3BO_3$ (33.38 g/kg) and $Na_2O$ (15 g/kg), with $H_3BO_3/Na_2O$ weight ratio equal to 2.22 and having a pH of about 12 were prepared. Then to this aqueous solution 700 g of Peruvian Ulexite, with a content of 688.29 g/kg of $H_3BO_3$, 71.53 g/kg of $Na_2O$ and 131 g/kg of CaO, were added.

The suspension was maintained under stirring at a temperature of 150° C. and at a pressure of 5 bars for 30 minutes. The resulting suspension had a pH equal to 10–11 with a $H_3BO_3/Na_2O$ ratio equal to 3.5, it was filtered, thereby obtaining 1100 g of a solid product consisting of calcium borate, which, after washing with 423 g of water, had a humidity of 70% and a total content of $H_3BO_3$ equal to 236.75 g/kg, of CaO equal to 83.36 g/kg, of $Na_2O$ equal to 4.18 g/kg, and 3850 g of a liquid having a content of $H_3BO_3$ equal to 90.68 g/kg and of $Na_2O$ equal to 26.72 g/kg.

The filtrate was crystallized at 30° C., therefrom obtaining 379 g of sodium borate decahydrate at 10% of humidity, which, after drying, provided a product with a $H_3BO_3$ content of 649 g/kg and a $Na_2O$ content of 164.98 g/kg, besides 3471 g of mother liquor with a $H_3BO_3$ content of 36.80 g/kg and a $Na_2O$ content of 13.42 g/kg, with a $H_3BO_3/Na_2O$ ratio equal to 2.74, which was brought to volume again and added with sodium hydroxide before being recycled to the reaction in order to get $H_3BO_3/Na_2O$ preestablished ratio.

The cycle was repeated 100 times and the first cycle was started with a synthetic mother liquor having the impurities contained in the Peruvian Ulexite, and all the system reached the equilibrium after 20 cycles.

EXAMPLE 2

3827 g of a synthetic sodium borate mother liquor containing $H_3BO_3$ (33.38 g/kg) and $Na_2O$ (15 g/kg), with a $H_3BO_3/Na_2O$ ratio equal to 2.22 were prepared. Then to this aqueous solution 700 g of Peruvian Ulexite with a content of 688.29 g/kg of $H_3BO_3$, 71.53 g/kg of $Na_2O$ and 131 g/kg of CaO, were added.

The suspension was maintained under stirring at a temperature of 120° C. and at a pressure of 2 bars for 30 minutes. The resulting suspension had $H_3BO_3/Na_2O$ ratio equal to 3.34, it was filtered, thereby obtaining 1280 g of a solid product consisting of calcium borate, which, after washing with 423 g of water, had a humidity to 70% and a total content of $H_3BO_3$ equal to 285.60 g/kg, of CaO equal to 71.64 g/kg, of a $Na_2O$ equal to 24.49 g/kg, and 3670 g of a liquid having a content of $H_3BO_3$ equal to 66.48 g/kg and of $Na_2O$ equal to 20.74 g/kg.

The filtrate was crystallized at 30° C., therefrom obtaining 210 g of sodium borate decahydrate at 10% of humidity, which, after drying, provided a product with a $H_3BO_3$ content of 649 g/kg and a $Na_2O$ content of 164.98 g/kg, besides 3460 g of mother liquor with a $H_3BO_3$ content of 35.06 g/kg and a $Na_2O$ content of 12.99 g/kg, with a $H_3BO_3/Na_2O$ ratio equal to 2.70. Such composition allows to reproduce quantity and characteristics of the mother liquor, which was used initially in the ore disaggregation step, by adding an aqueous NaOH solution.

EXAMPLE 3

3827 g of a synthetic sodium borate mother liquor containing $H_3BO_3$ (33.38 g/kg) and $Na_2O$ (15 g/kg) with a $H_3BO_3/Na_2O$ ratio equal to 2.22 were prepared. Then to this aqueous solution 700 g of Peruvian Ulexite with a content of 688.29 g/kg of $H_3BO_3$, 71.53 g/kg of $Na_2O$ and 131 g/kg of CaO, were added.

The suspension was maintained under stirring at a temperature of 200° C. and at a pressure of 16 bars for 30 minutes. The resulting suspension had a pH equal to 10–11 with a $H_3BO_3/Na_2O$ ratio equal to 3.6, it was filtered, thereby obtaining 1069 g of a solid product consisting of calcium borate, which, after washing with 423 g of water, had a humidity of 70% and a total content of $H_3BO_3$ equal to 226.71 g/kg, of a CaO equal to 85.78 g/kg, of $Na_2O$ less than 0.1 g/kg, and 3881 g of a liquid having a content of $H_3BO_3$ equal to 94.61 g/kg and of $Na_2O$ equal to 27.69 g/kg.

The filtrate was crystallized at 30° C., therefrom obtaining 415 g of sodium borate decahydrate at 10% of humidity, which, after drying, provided a product with a $H_3BO_3$ content of 649 g/kg and a $Na_2O$ content of 164.98 g/kg, besides 3466 g of mother liquor with a $H_3BO_3$ content of 36.01 g/kg and a $Na_2O$ content of 13.23 g/kg, with a $H_3BO_3/Na_2O$ ratio equal to 2.72. Such composition allows to reproduce quantity and characteristics of mother liquor, which was used initially in the ore disaggregation step, by adding NaOH aqueous solution before recycling to the reaction. The cycle was carried out by using a synthetic mother liquor containing the impurities of the Peruvian Ulexite.

EXAMPLE 4 (comparative)

3827 g of a synthetic sodium borate mother liquor containing $H_3BO_3$ (33.38 g/kg) and $Na_2O$ (22.25 g/kg) with a $H_3BO_3/Na_2O$ ratio equal to 1.50 were prepared. Then to this aqueous solution 700 g of Peruvian Ulexite with a content of 688.29 g/kg of $H_3BO_3$. 71.53 g/kg of $Na_2O$ and 131 g/kg of CaO were added.

The suspension was maintained under stirring at a temperature of 150° C. and at a pressure of 5 bars for 30 minutes. The resulting suspension has a pH equal to 11-12 with a $H_3BO_3/Na_2O$ ratio equal to 2.8 it was filtered, thereby obtaining 1069 g of a solid product consisting of calcium borate, which, after washing with 423 g of water, had a humidity of 70% and a total content of $H_3BO_3$ equal to 226.71 g/kg, of CaO equal to 85.78 g/kg, of a $Na_2O$ less than 0.1 g/kg, and 3881 g of a liquid having a content of $H_3BO_3$ equal to 94.61 g/kg and of $Na_2O$ equal to 34.84 g/kg.

The filtrate was crystallized at 30° C., therefrom obtaining 265 g of sodium borate decahydrate at 10% of humidity, which, after drying, provided a product with a $H_3BO_3$ content of 649 g/kg and a $Na_2O$ content of 164.98 g/kg, besides 3616 g of mother liquor with a $H_3BO_3$ content of 58.74 g/kg and a $Na_2O$ content of 26.51 g/kg, with a $H_3BO_3/Na_2O$ ratio equal to 2.22 thus the starting conditions (ratio 1.5) were not reproducible and the mother liquor could not be recycled unless unacceptable corrections in a closed cycle were carried out (great amount of NaOH should have been added in order to reach the 1.5 ratio).

The cycle was carried out with a synthetic mother liquor containing the impurities of Peruvian Ulexite and it was disregarded because of the low yield in sodium borate decahydrate recovery and of the impossibility of recycling the mother liquor to the reaction due to their final composition.

EXAMPLE 5 (comparative)

3827 g of a synthetic sodium borate mother liquor containing $H_3BO_3$ (33.38 g/kg) and $Na_2O$ (9.54 g/kg) with a $H_3BO_3/Na_2O$ ratio equal to 3.50 were prepared. Then to this aqueous solution 700 g of Peruvian Ulexite with a content of 688.29 g/kg of $H_3BO_3$. 71.53 g/kg of $Na_2O$ and 131 g/kg of CaO, were added.

The suspension was maintained under stirring at a temperature of 150° C. and at a pressure of 5 bars for 30 minutes.

The resulting suspension had a pH equal to 9-10 with a $H_3BO_3/Na_2O$ ratio equal to 4.25, it was filtered, thereby obtaining 1846 g of a solid product consisting of calcium borate, which, after washing with 423 g of water, had a humidity of 70% and a total content of $H_3BO_3$ equal to 225.56 g/kg, of CaO equal to 49.68 g/kg, of a $Na_2O$ equal to 21.70 g/kg, and 3104 g of a liquid having a content of $H_3BO_3$ equal to 62.23 g/kg and of $Na_2O$ equal to 14.99 g/kg.

The high $Na_2O$ content of the separated calcium borate shows an incomplete disaggregation of the ore.

The filtrate was crystallized at 30° C., therefrom obtaining 78 g of sodium borate decahydrate at 10% of humidity, which, after drying, provided a product with a $H_3BO_3$ content of 649 g/kg and a $Na_2O$ content of 164.98 g/kg, besides 3026 g of mother liquors with a $H_3BO_3$ content of 48.78 g/kg and a $Na_2O$ content of 11.55 g/kg, with a $H_3BO_3/Na_2O$ ratio equal to 4.22. Such composition does not allow to restore starting conditions in the mother liquor to be recycled unless unacceptable corrections in a closed cycle were carried out. The cycle was carried out with a synthetic mother liquor containing the impurities of the Peruvian Ulexite, and it was disregarded because of the low yield in sodium borate decahydrate recovery (incomplete or disaggregation) and of the impossibility of recycling the mother liquor to the reaction due to his final composition.

I claim:

1. A process for preparing sodium borate and calcium borate starting from ground boronatrocalcite (ulexite), comprising:
   a) disaggregating boronatrocalcite by maintaining ground boronatrocalcite in an aqueous disaggregation liquid having an $H_3BO_3/Na_2O$ weight ratio controlled between 1.8 and 2.7 and $Na_2O$ content between 12 and 20 g/kg at a temperature from 120° to 200° C. thereby forming an aqueous suspension;
   b) recovering solid calcium borate from the aqueous suspension through hot filtration leaving a liquid filtrate;
   c) crystallizing sodium borate dehydrate from the liquid filtrate at a temperature of about 30° C. and separating crystallized product from mother liquor;
   d) adding sodium hydroxide to the mother liquor of step c), thereby controlling the $H_3BO_3/Na_2O$ weight ratio between 1.8 and 2.7;
   wherein the mother liquor with NaOH obtained in step d) is recycled for use in step a) as said disaggregation liquid.

2. The process according to claim 1, wherein the $H_3BO_3/Na_2O$ weight ratio in the disaggregation liquid used in step a) ranges from 2.0 to 2.5.

3. The process according to claim 1, wherein the disaggregating step a) is carried out for 30-60 minutes.

4. The process according to claim 1, wherein said crystallizing step c) is carried out in a crystallizer under vacuum, said vacuum being maintained so that the temperature is at about 30° C. in order to precipitate sodium borate decahydrate.

5. A process according to claim 1, wherein said disaggregating boronatrocalcite step a) is at a self-generated pressure.

6. The process according to claim 5, wherein said said boronatrocalcite is disaggregated in step a) for 30-60 minutes.

7. The process according to claim 5, wherein said crystallizing step c) is carried out in a crystallizer under a vacuum, said vacuum being maintained so that the temperature is at about 30° C. in order to precipitate sodium borate decahydrate.

* * * * *